United States Patent [19]

Long et al.

[11] Patent Number: 4,933,391

[45] Date of Patent: Jun. 12, 1990

[54] FUNCTIONALIZED POLYMERS

[75] Inventors: Timothy E. Long, Rochester; Sam R. Turner, Pittsford, both of N.Y.

[73] Assignee: Eastman Kodak Company, Rochester, N.Y.

[21] Appl. No.: 311,663

[22] Filed: Feb. 16, 1989

[51] Int. Cl.$^5$ .............................................. C08F 8/00
[52] U.S. Cl. .................................... 525/106; 525/105
[58] Field of Search ................................. 525/105, 106

[56] References Cited

U.S. PATENT DOCUMENTS

| | | | |
|---|---|---|---|
| 3,840,616 | 10/1974 | Clark et al. | 525/105 |
| 3,929,850 | 12/1975 | Streck et al. | 260/448.2 |
| 3,956,419 | 5/1976 | Murray | 260/827 |
| 4,185,042 | 1/1980 | Veekouw | 525/332 |
| 4,334,036 | 6/1982 | Yonezawa et al. | 525/102 |
| 4,371,670 | 2/1983 | Bi | 525/342 |
| 4,379,891 | 4/1983 | Haynes | 525/342 |
| 4,408,017 | 10/1983 | Martin | 525/288 |
| 4,518,726 | 5/1985 | Kato et al. | 525/32 |
| 4,618,650 | 10/1986 | Halasa et al. | 525/105 |

OTHER PUBLICATIONS

Laible et al., "Advances in Colloid and Interface Science", 13, (1980) pp. 65–99.

*Primary Examiner*—Melvyn I. Marquis
*Attorney, Agent, or Firm*—Robert A. Linn

[57] ABSTRACT

Living polymers endcapped with a silicon containing group can be prepared by reacting a living, anionic polymer with an endcapping agent such as p-(chloromethylphenyl)trimethoxysilane. Such materials possess narrow molecular weight distributions, predictable molecular weights, and high functionality. The functionality is controlled by employing either a monofunctional (f=1) or difunctional (f=2) initiator. The endcapped, unifunctional products of this invention can serve as stable precursors for the preparation of soluble, branched polymers, and the difunctional products of this invention serve as efficient, water curable coatings.

12 Claims, No Drawings

FUNCTIONALIZED POLYMERS

CROSS-REFERENCE TO RELATED APPLICATION

Reference is made to a related application filed by the same inventors on the same date as this application: application Ser. No. 311,555 entitled Silyl Terminated Polymers, Attorney Docket 54,882B.

FIELD OF THE INVENTION

This invention relates to anionic living polymers endcapped with silicon-containing group exemplified by the group:

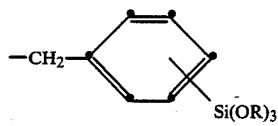

wherein each R is independently selected from the hydrogen radical, and straight chain lower alkyl radicals, and the —Si(OR)$_3$ moiety is ortho, meta or para to the —CH$_2$— group.

RELATED ART

U.S. Pat. No. 3,929,850 teaches that stellate polymers are formed by reacting a unilaterally lithium-terminated living polymer with a tri- or tetrahalogen compound, e.g., methyltrichlorosilane, or silicon tetrachloride. The patent also teaches that polymers formed by metathesis can be end-capped by reaction with a silicon compound containing a vinyl group.

U.S. Pat. No. 3,956,419 teaches that living polymers can be terminated with hexamethylcyclotrisiloxane and various specified chlorosilanes containing a vinyl or allyl group (col. 3, lines 48–54).

U.S. Pat. No. 4,334,036 teaches a process for preparation of water curable resins comprising a reaction of vinyl resins having carbon-carbon double bonds with hydrosilanes having an Si—H bond.

U.S. Pat. No. 4,371,670 discloses copolymers that are (a) produced from living polymer anions and (b) contain silicon units in the polymeric backbones. The silicon units are derived from dihalosilanes (col. 1, lines 36–50). The silanes do not contain an alkoxy group.

U.S. Pat. No. 4,379,891 teaches the reaction of lithium metal-terminated polymers with a coupling agent, (R$_1$O)$_3$—Si—R$_2$—O—R$_2$—Si—(OR$_1$)$_3$, wherein R$_1$ is an alkyl group of 2 to 10 carbon atoms. The products produced by the process of the patent have a functionality (or number of arms) equal to 4.

U.S. Pat. No. 4,408,017 teaches the reaction of lithium metal-terminated living polymers with a silicon-containing coupling agent which has a bicycloheptadienyl ring. Three-armed, star polymers are disclosed. The living polymer is preferably endcapped with butadiene prior to reacting with the coupling agent. The coupling reaction is preferably conducted in diethyl ether.

U.S. Pat. No. 4,518,726 discloses metallic base paints containing a vinyl type resin having at least one silicon atom attached to a hydrolyzable group. The silicon-containing reactants have an Si—H bond or an olefinic linkage disclosed (col. 2, line 48, to col. 3, line 5; and col. 4, line 15, to col. 5, line 18).

U.S. Pat. No. 4,618,650 teaches the reaction:

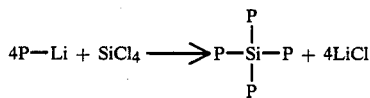

wherein P represents a living polymer chain. The patent says the relationship between the reactants must be stoichiometrically perfect in order to endlink every lithium terminated polymer chain in the polymer being treated. If more than a stoichiometric amount of SiCl$_4$ is used, PSiCl$_3$ is formed, and these —SiCl$_3$ terminated chains do not react with each other to become cross-linked.

The patent provides a method wherein an excess of linking agent can be used. The metal terminated polymer is first reacted with an excess of halogenated silicon compound containing at least two halogens, then reacted with a tertiary alcohol to produce a polymer which is terminated with alkoxy silyl moieties, and finally heated to cause a linking of polymeric chains to take place.

In contrast to materials provided by U.S. Pat. No. 4,618,650, the products of this invention (a) have an endcapping group which comprises a benzyl or substituted benzyl radical, and (b) which do not contain an alkoxy group containing a tertiary alkyl radical.

SUMMARY OF THE INVENTION

This invention provides new compositions of matter which are endcapped polymers. The endcapping group or groups are bonded to a polymeric chain previously formed by an anionic polymerization. The endcapping group is attached to the chain through the alpha carbon of a benzyl group which is bonded directly, or through an alkylene bridge, to an —Si(OR)$_3$ group, in which each R is independently selected from hydrogen and a lower alkyl radical.

Preferred polymers of this invention have an endcapping group on one end of the polymer chain. These preferred polymers are produced from unifunctional living polymers, i.e. living polymers having a negative charge on only one end of the polymeric chain.

The endcapped polymers of this invention can be condensed to form larger polymers. The condensed polymers can be well defined stellate polymers of narrow molecular weight distribution. They can be used to prepare films and protective coatings.

DESCRIPTION OF PREFERRED EMBODIMENTS

This invention provides endcapped polymers having the formula: T—P—E—(CH$_2$)$_n$—Si(OR)$_3$ wherein T is either an initiator fragment, or the endcapping group —E—(CH$_2$)$_n$—Si(OR)$_3$ wherein each R is independently selected from hydrogen and straight chain alkyl radicals of up to about four carbon atoms, E is a benzyl or substituted benzyl group having up to about 12 carbon atoms, P is a poly(vinyl aromatic) or poly(diene) chain, and n is a whole number having a value of 0 to about 4. Such products are produced by reacting a unifunctional metal terminated anionic living polymer P-M, or a difunctional metal terminated anionic living polymer M-P-M, with a endcapping agent such as described below. To substitute hydroxy groups for alkoxy groups bonded to the silicon atoms, the endcapped polymers can be hydrolyzed or partially hydrolyzed, preferably in the presence of an acid catalyst. For example, the hydrolysis can be conducted using 0.15N HCl. A basic catalyst, e.g. 1.0N NH$_4$OH, can also be used. The hydrolysis is usually accompanied by a condensation, as discussed below.

The metal terminated polymers used as starting materials in this invention have the formula P-M or M-P-M, wherein P is a polymer chain and M is a metal of Group IA or IIA of the Periodic Table. Preferably the metal is magnesium, lithium or sodium; more preferably sodium or lithium.

The metal catalysts employed to form the metal terminated polymers can be organometallic compounds such as $R^1$—Li wherein $R^1$ is a loweralkyl group of 2 to 8 carbons, e.g., butyl lithium. Sodium derivatives such as the sodium salts of α-methylstyrene, 1,1-diphenylethylene, naphthalene, and the like can also be employed as catalysts to prepare difunctional chains. Generally, $10^{-1}$ to $10^{-4}$ moles of catalyst are employed per each 100 grams of olefin.

The organic fragment in the metal catalyst becomes attached to one end of unifunctional living polymers, i.e. the end of the chain which does not have a negative charge (satisfied by the positive charge of a metal cation). The nature of the initiator fragment is not a critical feature of this invention, and can be derived from any metal catalyst suitable for initiation of an anionic, "living" polymerization.

Many unsaturated monomers containing carbon-to-carbon double bonds can be polymerized using metal catalysts to yield living polymers. These include conjugated and non-conjugated dienes and vinyl-substituted aromatic compounds. Some illustrative but non-limiting examples of useful dienes include the conjugated dienes having up to about 18 carbons, such as 1,3-butadiene, isoprene, 1,3-pentadiene, 2-phenyl-1,3-butadiene, 1,3-octadecene, and the like. Illustrative but non-limiting examples of vinyl substituted aryl monomers include styrene, 4-methylstyrene, 4-tert-butylstyrene, 4-decylstyrene, α-methylstyrene, 2-vinylnaphthalene, and other vinyl substituted aromatics having up to about 18 carbon atoms.

It will be understood by a skilled practitioner that the living polymers used as intermediates in this invention can be homopolymers, copolymers or block copolymers.

The living polymerization is conveniently carried out at a temperature of from about −85° C. to about 120° C. The polymerization is also conveniently carried out in a liquid ether or aliphatic hydrocarbon which does not react with the catalyst. Tetrahydrofuran, cyclohexane, petroleum ether, and the like can be used. (When a reaction medium, such as tetrahydrofuran, has a tendency to react with material(s) used in the process, such an undesirable side reaction can be minimized in some instances by conducting the process at a low temperature. Hence, one may use a reaction temperature as low as about −78° C. or lower when tetrahydrofuran is employed as the reaction medium).

Further details concerning the preparation of living polymers of the type used in this invention are available in the art, e.g., U.S. Pat. Nos. 3,956,419; 4,371,670; 4,379,891; 4,408,017; and 4,618,650. The descriptions of living polymers and methods for their formation within those patents are incorporated by reference herein as if fully set forth.

The endcapping process of this invention can be applied to anionic living polymers having any molecular weight. Hence, the molecular weight is not a critical variable in the process (although the molecular weight will have a bearing on the properties of the product produced, as discussed below). For convenience, it is preferred that the metal terminated polymer P-M or M-P-M have a polymeric chain with a molecular weight in the range of from about 500 to about 1,000,000, more preferably form about 1,000 to about 100,000.

It is to be understood that the molecular weight of the polymeric products of this invention will generally have a bearing on their reactivity. For example, if the products of this invention are to be subjected to a hydrolysis/condensation reaction by exposing them to water and an acidic or basic catalyst, the kinetics of the hydrolysis/condensation will in general be inversely proportional to the molecular weight of the materials being condensed. Thus, to achieve the same degree of condensation, products of higher molecular weight will generally require more stringent reaction conditions (higher temperature and/or longer reaction times) than products of lower molecular weight. For example to condense higher molecular weight polymers of this invention they may need to be heated at a temperature of from about 100° C. to about 120° C. for from about 10 to about 14 days.

Several criteria must be met for the selection of a suitable functionalization (endcapping) reagent. First, an electrophilic site for direct deactivation of the polymeric carbanion must be present in the molecule. Also, the reaction should be quantitative or nearly quantitative, in order to maximize the efficiency of subsequent formation of condensed products. In addition, the efficiency of the functionalization reaction should be characterizable by a variety of complimentary techniques, e.g. spectroscopic and chemical. Satisfaction of the two latter criteria is not a trivial task, since the concentration of the endgroup is generally quite low. Furthermore, if the molecule contains the desired end group functionality, then this group must be inert to a polymeric carbanion under the appropriate conditions for attack at the electrophilic site.

p-(Chloromethylphenyl)trimethoxysilane (CMPTMS), has been found to meet the above structural prerequisites. Other endcapping agents contemplated for use in this invention are compounds related to CMPTMS they are discussed below.

For this invention endcapping agents are selected from those having the formula:

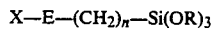

wherein X is a halogen radical selected from fluoride, chloride, bromide, and iodide, E is a benzyl or substituted benzyl group having up to about 12 carbon atoms, such that said halogen radical is bonded to the alpha carbon atom in said benzyl or substituted benzyl group, R is an alkyl radical of up to about 4 carbon atoms, and n is equal to 0 to 4.

As indicated above, endcapping agents of this invention comprise a benzyl configuration;

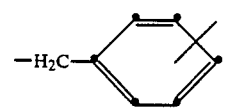

The ring may be further substituted with groups which do not interfere in the reaction e.g. one or more alkyl groups.

Examples of endcapping agents useful in this invention are o-(chloromethylphenyl)trimethoxysilane, p-(chloromethylphenyl)trimethoxysilane, the triethoxy, tripropoxy, and tri-n-butoxy analogs of these compounds, o-(bromomethylphenyl)trimethoxysilane, p-(bromomethylphenyl)trimethoxysilane, 1-trimethoxysilyl-2-(p,m-chloromethyl)phenylethane, and the fluoro, and iodo analogs of those compounds. Compounds containing alkyl groups such as methyl, ethyl, and n-hexyl bonded to the ring are also useful. The endcapping agent may be a mixture of compounds; for example it may be a mixture of isomers such as 90% p-(chloromethylphenyl) trimethoxysilane and 10% by weight o-(chloromethylphenyl) trimethoxysilane.

The endcapping reaction can be carried out in the reaction medium in which the metal terminated polymer is formed. The reaction temperature is not critical. It has been conducted at −78° C. in tetrahydrofuran and at 60° C. in cyclohexane. Temperatures above and below those temperatures, e.g., from about −85° C. to about 100° C., can be employed if desired. The reaction can be conducted for a reaction time within the range of from about 0.25 to about 2.0 hours. Shorter and longer times can be used if desired.

The endcapping reaction is preferably conducted using an excess (10–100 mole % or more) of the endcapping agent. However, it is not necessary that an excess be used; an exact stoichiometry can be employed, if desired. The process is preferentially conducted at ambient or slightly elevated pressures e.g. 1 atmosphere to about 10 psig.

The functionalized, i.e. endcapped polymers prepared by reacting the metal terminated polymers and above-described endcapping agents are soluble in a material such as tetrahydrofuran, dimethylformamide, dimethylacetamide, acrylonitrile, N-methylpyrollidone, sulfolane, dimethylsulfoxide, and the like.

To hydrolyze and condense the products of this invention, such solutions are admixed with an excess of water (compared to silicon). As stated above, the hydrolysis/condensation reaction is preferably conducted in the presence of an acid catalyst such as hydrochloric acid. Other volatile acids can be used such as acetic acid.

The hydrolysis/condensation reaction is conducted in general accordance with the art. Thus, it may be performed using conditions within the ranges set forth in Scholze et al, U.S. Pat. No. 4,238,590 (col. 4, line 30, to col. 5, line 29). That portion of the Scholze patent is incorporated by reference herein as if fully set forth.

EXPERIMENTAL

Materials and Purification

Styrene (Aldrich) and isoprene (Aldrich) were stirred over finely ground calcium hydride for 1–2 days and vacuum distilled. The distilled monomers were stored at −25° C. under nitrogen in a brown bottle until further use. Immediately prior to polymerization, the monomers were vacuum distilled from dibutyl magnesium (DBM). DBM (Lithco) was available as a 25% solution in heptane and transferred using syringe techniques. This reagent removes air and water from hydrocarbon monomers. The DBM was added dropwise to the monomer at room temperature until a stable, pale, yellow color persisted. It is believed that this color is associated with complexation of the unsaturated site and DBM. Typically, 60 mL of styrene required 4–5 mL of dibutyl magnesium. Both distillation yields were quantitative.

s-Butyllithium (s-BuLi) was obtained from Lithco Division of FMC as a 1.31M solution in hexane. The concentration of the solution was determined by the Gilman "double titration" technique and the homopolymerization of polystyrene. The initiator was generally used as received and was stored at −25° C. for several months without significant degradation.

The sodium/naphthalene anion was utilized as the difunctional initiator. Naphthalene (scintillation grade, Aldrich) was sublimed at 30° C. immediately prior to the initiator preparation. Sodium (Aldrich) was obtained as a neat chunk and used as received. Tetrahydrofuran (THF) was distilled from sodium/benzophenone under nitrogen immediately prior to the reaction. Approximately 1.5 g of sodium was finely sliced in a Schlenk vessel under a nitrogen purge. An equivalent weight of sublimed naphthalene was added to the sodium metal. The Schlenk vessel was capped with a rubber septum which was secured by copper wire and a positive pressure of nitrogen was maintained. Tetrahydrofuran (50 mL) was added via a syringe to the sodium/naphthalene at room temperature, and immediately a green color developed. The green color is indicative of the formation of the radical anion. The reaction was allowed to proceed for 18 hours, and the green solution was decanted with a cannula into a flame-dried bottle. The solution was generally used immediately; however, the radical anion was stored for later use at −25° C. for 5–10 days.

Cyclohexane (Kodak, Reagent Grade) was stirred in the presence of concentrated sulfuric acid for 5–10 days to remove unsaturated impurities. The cyclohexane was decanted from the sulfuric acid and stirred over a sodium dispersion for several days. The solvent was distilled from the sodium dispersion under an argon atmosphere immediately prior to use. Tetrahydrofuran (Baker, HPLC Grade) was distilled from a purple sodium/benzophenone ketyl under argon immediately prior to polymerization.

p-(Chloromethylphenyl)trimethoxysilane (CMPTMS) (Petrarch), was vacuum distilled immediately prior to use.

Polymerization

All glassware was rigorously cleaned and dried in an oven at 120° C. for 24 hours. The reactor was a 250 mL, 1 neck, round-bottom flask equipped with a magnetic stirrer and a rubber septum. The septum was secured in place with copper wire in order that a positive pressure of ultra pure nitrogen could be maintained. The reactor was assembled while hot, and subsequently flamed under a nitrogen purge. After the flask had cooled, the polymerization solvent (tetrahydrafuran) was added to the reactor via a double-ended needle (cannula). The reactor was submerged into a −78° C. bath and allowed to reach thermal equilibrium. Purified styrene monomer was charged into the reactor with a syringe. The calculated amount of initiator was quickly syringed into the reactor and immediately one could see the formation of the orange polystyryl lithium anion. The polymerization was allowed to proceed for 20 minutes to ensure complete conversion.

Polymerizations were also conducted in cyclohexane using s-butyl lithium as the initiator. In this case, polymerizations were conducted at 60° C. for two hours. The reactor consisted of a 3 neck, round-bottom flask which was fitted with an overhead stirrer, a condenser, and a rubber septum. All reagents were added through the rubber septum. A nitrogen blanket was maintained throughout the polymerization.

Functionalization

Upon completion of the polymerization, the endcapping reagent (50% molar excess compared to lithium) was added quickly via a syringe. The complete disappearance of the orange color was indicative of complete deactivation of the polymeric carbanion.

Polymer Purification

After functionalization, the polymers (molecular weights greater than 3000 g/mole) were precipitated in HPLC grade methanol which contained <0.05% water (determined by titration). The precipitation and vacuum filtration were conducted under a nitrogen blanket to minimize hydrolysis of the trialkoxysilyl end groups.

Polymers which had molecular weights below 3000 g/mole were not precipitated in order to avoid fractionation. Such low molecular weight polystyrenes were soluble in methanol.

The polymerization solvent was removed by rotoevaporation. All samples were dried in vacuo at 80° C. for 12–18 hours.

Characterization

Molecular weights and molecular weight distributions of the endcapped (i.e. functionalized) polymers were determined by Size Exclusion Chromatography (SEC) in THF at 25° C. A variable temperature Waters GPC was equipped with ultrastyragel columns of $10^3$ Å, 500 Å, and 100 Å for molecular weights less than 5000 g/mole, and $10^6$ Å, $10^5$ Å, $10^4$ Å, and $10^3$ Å for higher molecular weights. A Waters Differential Refractive Index (DRI) was utilized. Polystyrene standards (Polymer Laboratories) were used for the construction of calibration curves. The hydrolyzed/condensed, monofunctional polymers were also analyzed by SEC using a viscometric detector to obtain absolute molecular weights and to determine the extent of condensation.

$^1$H Nuclear Magnetic Resonance characterization was accomplished using a General Electric QE300 300 MHz NMR Spectrometer. The instrument was equipped with a superconducting magnet and had a 7.05 T field strength. The spectrometer was run by a Nicolet 1280 computer and the frequency resolution was 1.2 Hz. All samples were referenced to $CHCl_3$. When "living" polystyryl lithium is reacted with p-(chloromethylphenyl)trimethoxysilane the orange color which is associated with the polystyryl lithium carbanion disappears immediately upon addition of the endcapping reagent. $^1$H NMR analysis indicates the presence of the trialkoxysilyl group at 3.6 ppm. The presence of the initiator fragment which resides at the other end of the polymer chain is also evident between 0.6 and 1.2 ppm. Either the initiator fragment or the trialkoxysilyl group integration was compared to the repeat unit methylene and methyne integration in order to determine functional molecular weights.

Table 1 (below) shows the functional molecular weights for various endcapped polystyrene samples. Excellent agreement exists between the molecular weights based on the initiator fragment and molecular weights based on the trialkoxysilyl end group. In addition, the functional molecular weights compare favorable with the number average molecular weights determined by Size Exclusion Chromatography (SEC). These observations demonstrate an efficient and quantitative endcapping reaction. Molecular weight distributions are also fairly narrow (1.10–1.20) which indicate a well-defined polymerization and efficient functionalization reaction. The preparation of very narrow (<1.1) polydispersity, low molecular weight polymers is difficult in polar solvents due to comparable rates of initiation and propagation.

TABLE 1

Molecular Weight Determinations For p-(Chloromethylphenyl)trimethoxysilane Terminated Polystyrene Polymers

| Sample[a] | Mn(GPC)[b] | Mn(NMR)[c] | Mn(NMR)[d] | Mw/Mn |
|---|---|---|---|---|
| —Si(OCH$_3$)$_3$ | | | | |
| 7202-35 | 3,900 | 3,000 | 3,100 | 1.19 |
| 7202-44B | 3,100 | 2,700 | 2,700 | 1.13 |
| 7202-97C | 3,900 | 3,500 | 3,500 | 1.22 |

[a]Polymerization Conditions: THF, −78° C., s-Butyl-lithium
[b]Polystyrene Standards, THF, 25° C., DRI Detector
[c]Ratio repeat unit resonance to initiator fragment (s-butyl)
[d]Ratio repeat unit resonance to Si(OR)$_3$ $^{29}$Si spectra were obtained with a Bruker AM-500 instrument at 99.32 MHz. All samples were referenced to tetramethylsilane (TMS). Chromium acetylacetonate [Cr(AcAc)$_3$] was added at approximately 0.015M to reduce the longitudinal relaxation time (T$_1$) for the silicon-29 spectra. The silicon-29 spectra were obtained using inverse-gated decoupling (decoupler on during acquisition and off during the relaxation delay) to suppress any negative nuclear Overhauser effect. The relaxation agent and decoupling sequence facilitated quantitative measurements.

The glass transition temperatures of the endcapped and the hydrolyzed/condensed polymers were determined with a Perkin Elmer Differential Scanning Calorimeter (DSC) System 2. The first run was heated to 200° at 20° C. per minute and quenched. The glass transition was determined on the second run at 20° C. per minute.

Neutron Activation Analysis (NAA) also was utilized to verify the presence of both silicon and oxygen in the polymer and to calculate functional molecular weights. Functional molecular weights were obtained by comparing the percent silicon or oxygen to the percent carbon. Table 2 lists the functional molecular weights determined by both NMR and NAA for two samples. Excellent agreement exists between the different analyses.

TABLE 2

Molecular Weight Determinations By Neutron Activation Analysis (NAA) for CMPTMS Terminated Polystyrene Polymers

| Sample[a] | Mn(NMR)[b] | Mn(NMR)[c] | Mn(Si) | Mw(O) |
|---|---|---|---|---|
| —Si(OCH$_3$)$_3$ | | | | |
| 7202-44B | 2,700 | 2,700 | 2,600 | 2,700 |
| 7202-35 | 3,000 | 3,100 | 3,100 | 3,300 |

[a]Mn(theoretical) = 2,800 g/mole
[b]Based on initiator fragment (s-butyl)
[c]Based on Si(OR)$_3$ $^{29}$Si NMR is a discriminatory technique for the characterization of the endcapped polymers. In most cases, a resonance which is associated with a trimethoxysilyl group is only observed at approximately −54 ppm.

However, hydrolysis and condensation of the end groups during either precipitation or in air often lead to a small amount (2-10%) of dimer formation. The dimer Si—O—Si resonance appears at approximately −65 ppm. $^{29}$Si NMR also confirms that displacement of the methoxy group during functionalization does not occur.

Preparation of Condensed Polymers

To demonstrate utility of the endcapped polymers of this invention described above, the polymers were used to prepare condensed polymers, as described below.

The endcapped polymers were dissolved in tetrahydrofuran (15-18% solids) and a 4:1 molar ratio of water compared to silicon (based on polymer repeat unit molecular weight) was added as a 0.15N solution of HCl. After allowing the solutions to dry to a film in air, the samples were heated in vacuo at various conditions. Variables such as, molecular weight, functionality, and subsequent heat treatment were addressed.

Table 3 describes the change in the glass transition temperature (Tg) of the functionalized polystrene polymers upon hydrolysis and condensation. In each case, the samples were dried in vacuo at 75° C. for 3 hours prior to DSC analysis. The Tg was determined on the second run. The first run was heated to 200° C. and quenched; this ensured the removal of residual THF and water. A sample which was not treated with acid and water was designated by B (Blank) as the final letter in the sample name. If the sample were hydrolyzed/condensed with acid and water, then an A (Acid) was added as the final letter as the sample name. Samples 44B (2800 g/mole) and 97B (5000 g/mole) were both terminated at one end with a trimethoxysilyl group. Sample 112B (16,000 g/mole) was terminated at both ends with trimethoxysilyl groups: in all cases, the Tg (glass transition temperature) of the trimethoxysilyl terminated polymers increased upon hydrolysis and condensation.

TABLE 3

Effect of Hydrolysis and Condensation on the Glass Transition Temperature of Functionalized Polystyrene Polymers

| Sample[a] | End Group | Conditions | Functionality | Tg(°C.)[b] | ΔCp[c] |
|---|---|---|---|---|---|
| 44BB | Si(OCH$_3$)$_3$ | | 1 | 72 | 0.27 |
| 44BA | | ACID | 1 | 84 | 0.18 |
| 97CB | Si(OCH$_3$)$_3$ | | 1 | 78 | 0.30 |
| 97CA | | ACID | 1 | 89 | 0.21 |
| 112BB | Si(OCH$_3$)$_3$ | | 2 | 96 | 0.30 |
| 112BA | | ACID | 2 | 101 | 0.28 |
| NBS PS | H | | 0 | 102 | 0.31 |

[a]Reactions in THF at room temperature
[b]Heating Rate: 20° C./min., Nitrogen
First Scan: 25° C. to 200° C.; Tg determined on second scan
[c]J/g · K The solubility characteristics of the hydrolyzed/condensed, trimethoxysilyl terminated polystyrene polymers are of particular interest. After the hydrolysis and condensation of the monofunctionally terminated polymers, the films remained soluble in tetrahydrofuran. This characteristic facilitates the characterization of the reaction product by spectroscopic and gel permeation chromatographic techniques. The difunctional polymers were rendered insoluble after the hydrolysis and condensation. The films would only swell in tetrahydrofuran.

A striking feature is the narrow molecular weight distribution of the condensate from monofunctionally terminated polymers. The weight average molecular weight of an illustrated condensate is approximately four times the molecular weight of the endcapped precursor. This implies that a well defined macromolecule with four branches was efficiently formed under these conditions; however the processing conditions define the size of the condensate. The absence of appreciable, uncondensed precursor in the chromatogram of the condensate implies that the endcapping reaction was quite efficient. This type of behavior was reproducibly observed for various trimethoxysilyl terminated precursors which had different molecular weights.

The ordered, well defined nature of the soluble polymers produced from unifunctional living polymers suggests that the insoluble materials prepared from the difunctional living polymers have the same structural characteristics.

A skilled practitioner, familiar with the above detailed description of this invention can make many substitutions or modifications of the described embodiments without departing from the scope and spirit of the appended claims.

We claim:
1. An endcapped polymer having the formula: T—P—E—(H$_2$C)$_n$—Si(OR)$_3$ wherein T is selected from an initiator fragment or the endcapping group —E—(H$_2$C)$_n$—Si(OR)$_3$; each R is independently selected from hydrogen or straight chain alkyl radicals having up to about 4 carbon atoms, E is a benzyl or substituted benzyl group having up to 12 carbon atoms, n is a whole number having a value of 0 to 4, and P is a poly(vinylaromatic) or poly(diene)chain, said initiator fragment being select from an alkyl group of 2 to 8 carbon atoms, α-methylstyryl, 1,1-diphenylethyl, or naphthyl.
2. The endcapped polymer of claim 1 wherein T is an initiator fragment.
3. The polymer of claim 2 wherein said fragment is an alkyl radical having 2 to about 6 carbon atoms.
4. The polymer of claim 3 wherein said fragment is a secondary butyl radical.
5. The polymer of claim 1 wherein E is a benzyl group.
6. The polymer of claim 5 wherein each R is methyl.
7. The polymer of claim 1 wherein each R is independently selected from the methyl radical and the hydrogen radical.
8. The polymer of claim 1 wherein n is equal to zero.
9. The polymer of claim 1 wherein P is a poly(vinylaromatic) chain.
10. The polymer of claim 9 wherein P is a poly(styrene) chain.
11. The polymer of claim 1 wherein the endcapping group —E—(H$_2$C)$_n$—Si(OR)$_3$ bonded to P is

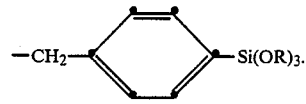

12. The polymer of claim 1 wherein T is sec-butyl, P is poly(styrene) and the endcapping group is

* * * * *